United States Patent [19]
Bishop

[11] Patent Number: 5,775,869
[45] Date of Patent: Jul. 7, 1998

[54] TRANSPORTABLE SPILL CONTAINMENT PAN

[75] Inventor: Merrill E. Bishop, Crystal Lake, Ill.

[73] Assignee: Trans Environmental Systems, Inc., Bay Village, Ohio

[21] Appl. No.: 732,796

[22] Filed: Oct. 15, 1996

[51] Int. Cl.[6] .................................................. B65D 88/00
[52] U.S. Cl. .......................... 414/608; 141/86; 206/508; 220/573; 184/106; 137/312
[58] Field of Search ........................... 414/608, 786; 220/571, 573; 206/508; 184/1.5, 106; 141/86; 137/312

[56] References Cited

U.S. PATENT DOCUMENTS

| | | |
|---|---|---|
| 4,114,660 | 9/1978 | Arruda . |
| 4,139,029 | 2/1979 | Geraci . |
| 4,651,887 | 3/1987 | Patrick . |
| 4,765,480 | 8/1988 | Motmarger .................. 206/508 X |
| 4,936,418 | 6/1990 | Clausen . |
| 5,052,422 | 10/1991 | Franz et al. . |
| 5,062,500 | 11/1991 | Miller et al. . |
| 5,069,343 | 12/1991 | Markle ............................ 206/508 |
| 5,090,588 | 2/1992 | Van Romer et al. . |
| 5,099,872 | 3/1992 | Tarvin et al. . |
| 5,143,178 | 9/1992 | Latham, Jr. . |
| 5,290,139 | 3/1994 | Hedrick .............................. 414/608 X |
| 5,291,746 | 3/1994 | Abbott ............................... 414/608 X |
| 5,311,993 | 5/1994 | Koch ................................... 206/508 X |
| 5,316,175 | 5/1994 | Van Romer . |
| 5,351,931 | 10/1994 | Houber et al. .................. 220/571 X |
| 5,435,458 | 7/1995 | Bishop . |
| 5,562,047 | 10/1996 | Forney et al. ................... 220/571 X |
| 5,562,224 | 10/1996 | Pescal et al. .................... 206/505 X |

*Primary Examiner*—David A. Bucci
*Attorney, Agent, or Firm*—Rankin, Hill, Porter & Clark LLP

[57] ABSTRACT

A transportable spill containment pan includes a reservoir that can be disposed between, and rested upon, conventional railroad rails beneath a stationary railroad tank car. The pan includes a pair of flaps that can be moved from a closed position where they overlie the reservoir and provide a cover therefor, to an extended position where they divert inadvertent spills into the reservoir. A pair of parallel, spaced tubes extend across the reservoir and through opposed sidewalls defining the reservoir. The tubes are of a size and shape to receive the forks of a conventional forklift truck, thereby permitting the pan to be moved conveniently from place to place. The pan includes endwalls connected to the flaps, the endwalls having horizontal ledges that enable another pan to be stacked atop the first.

17 Claims, 7 Drawing Sheets

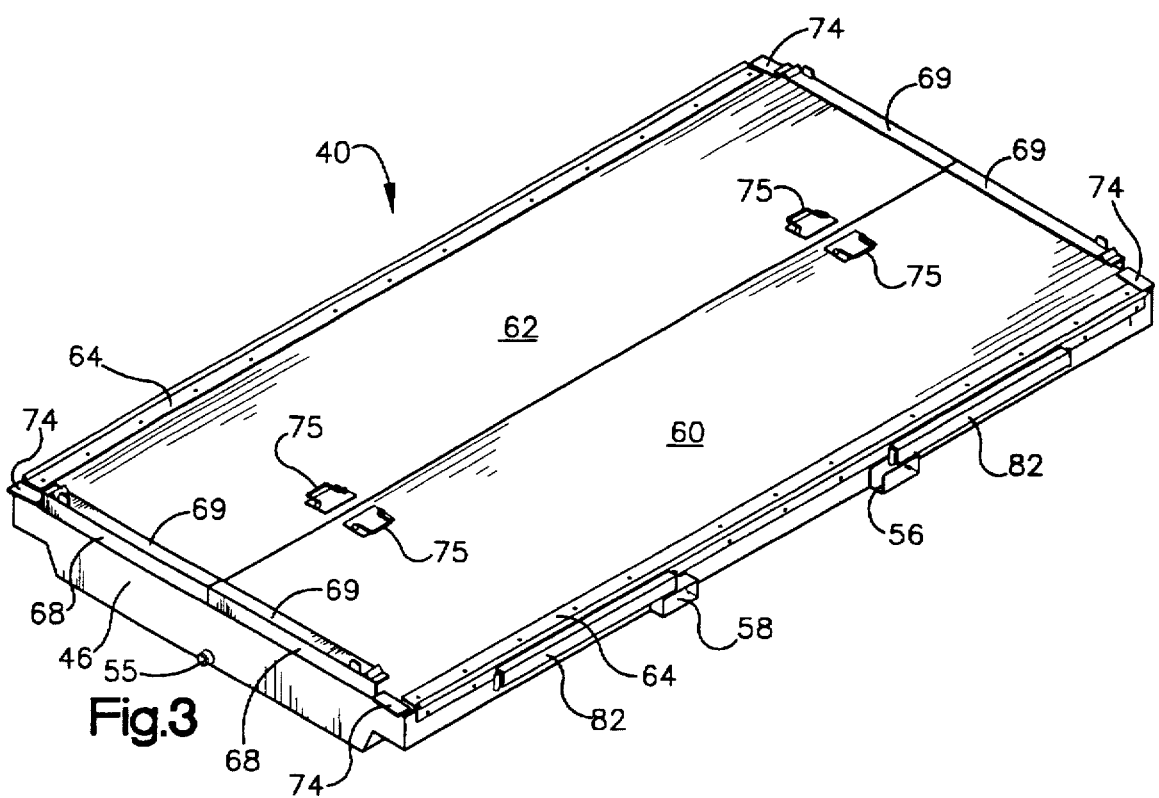
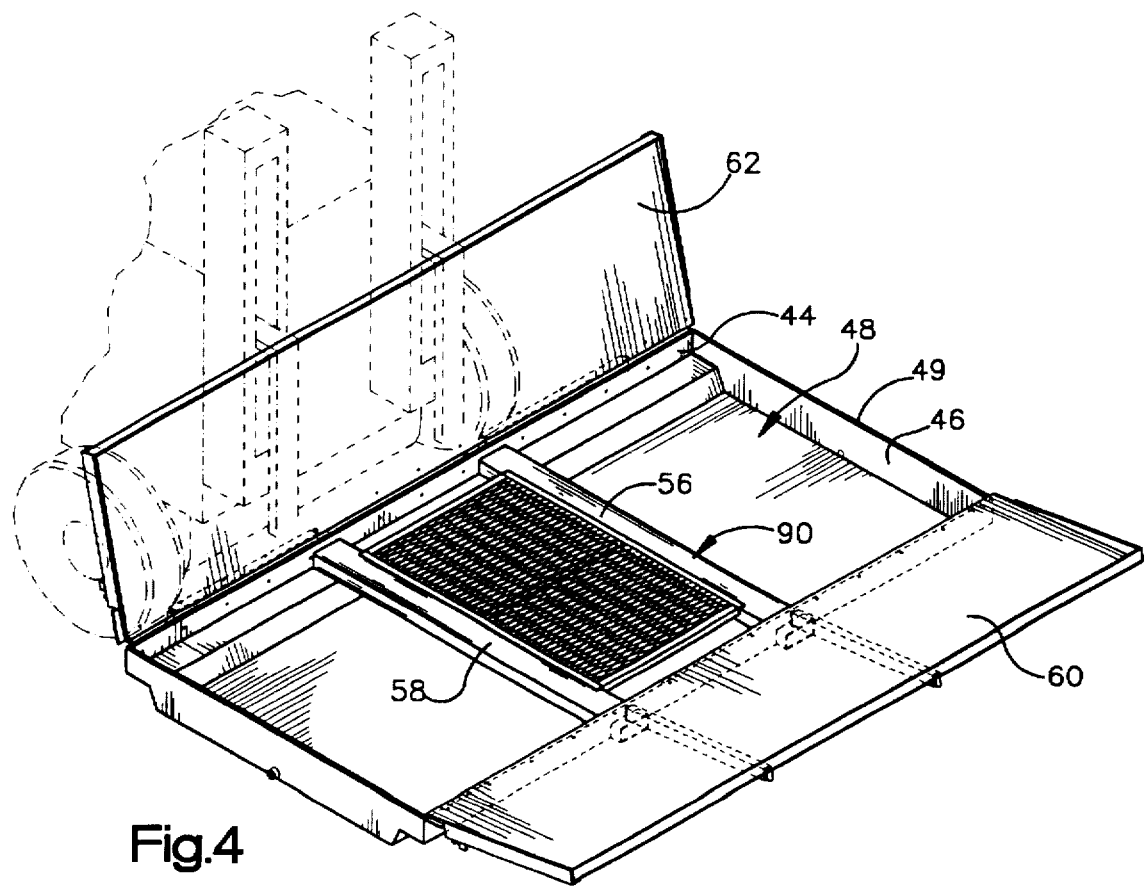

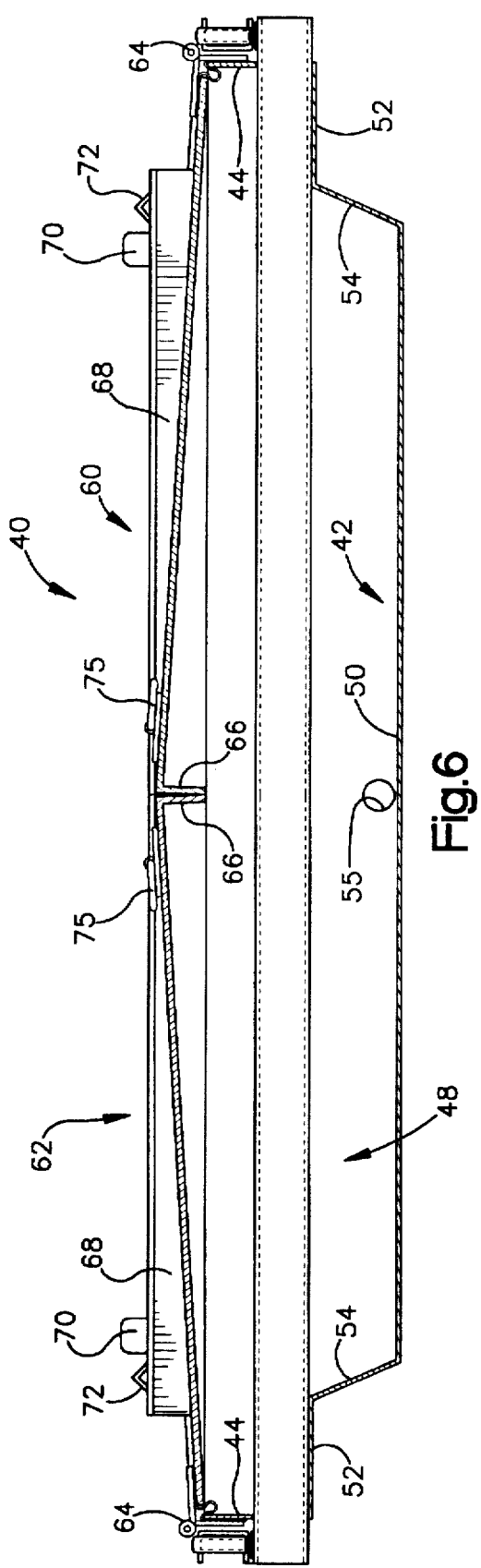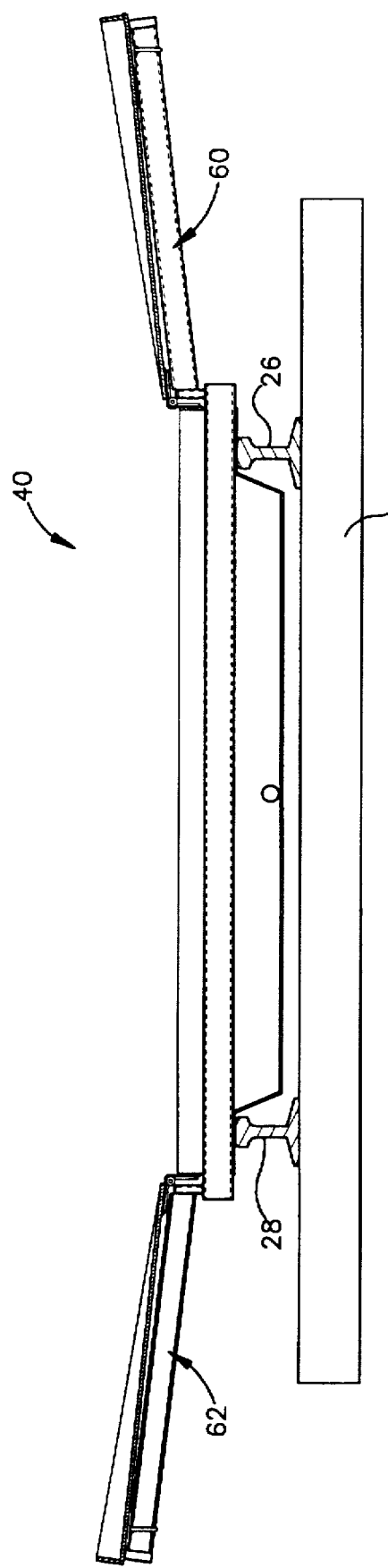

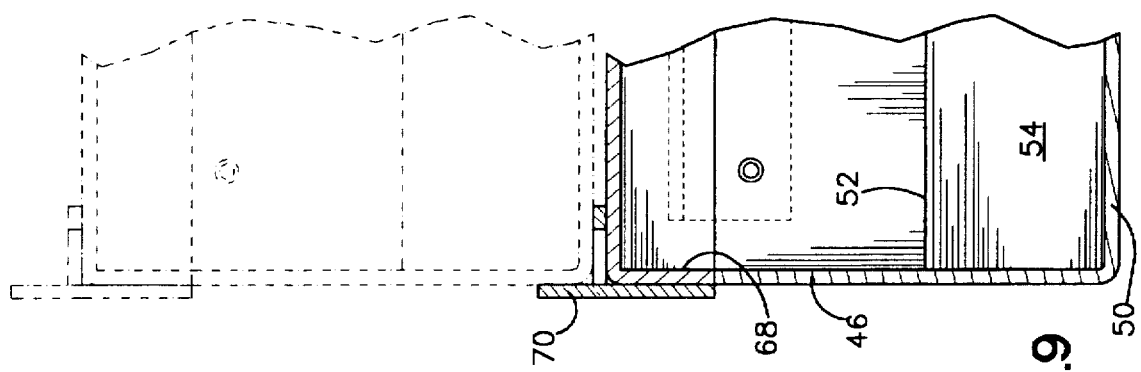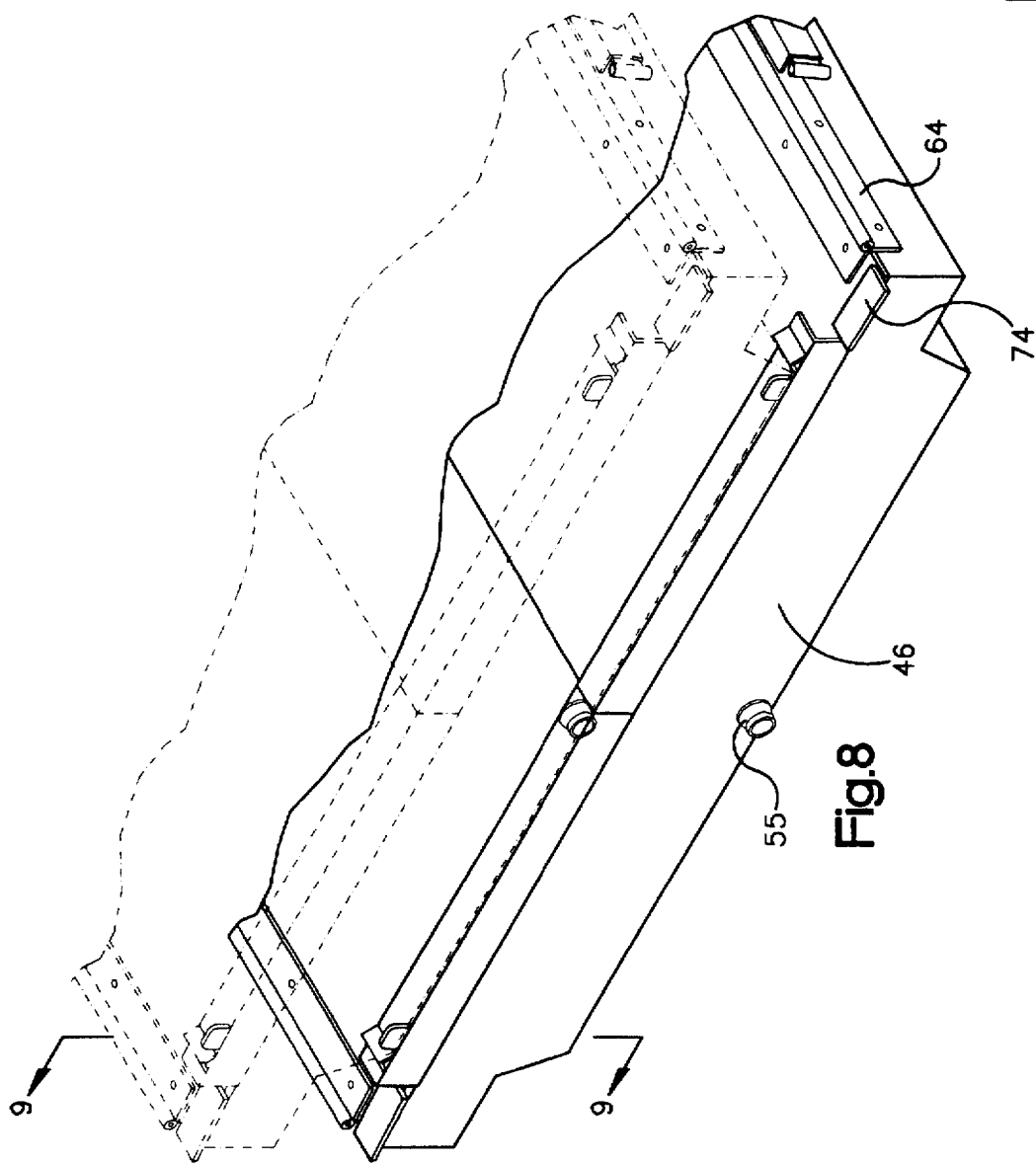

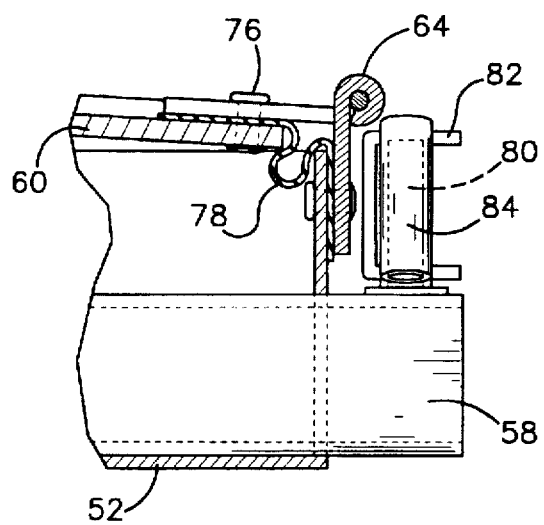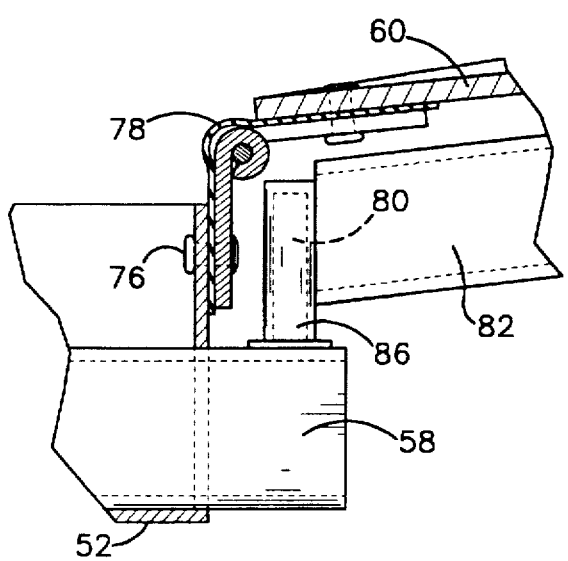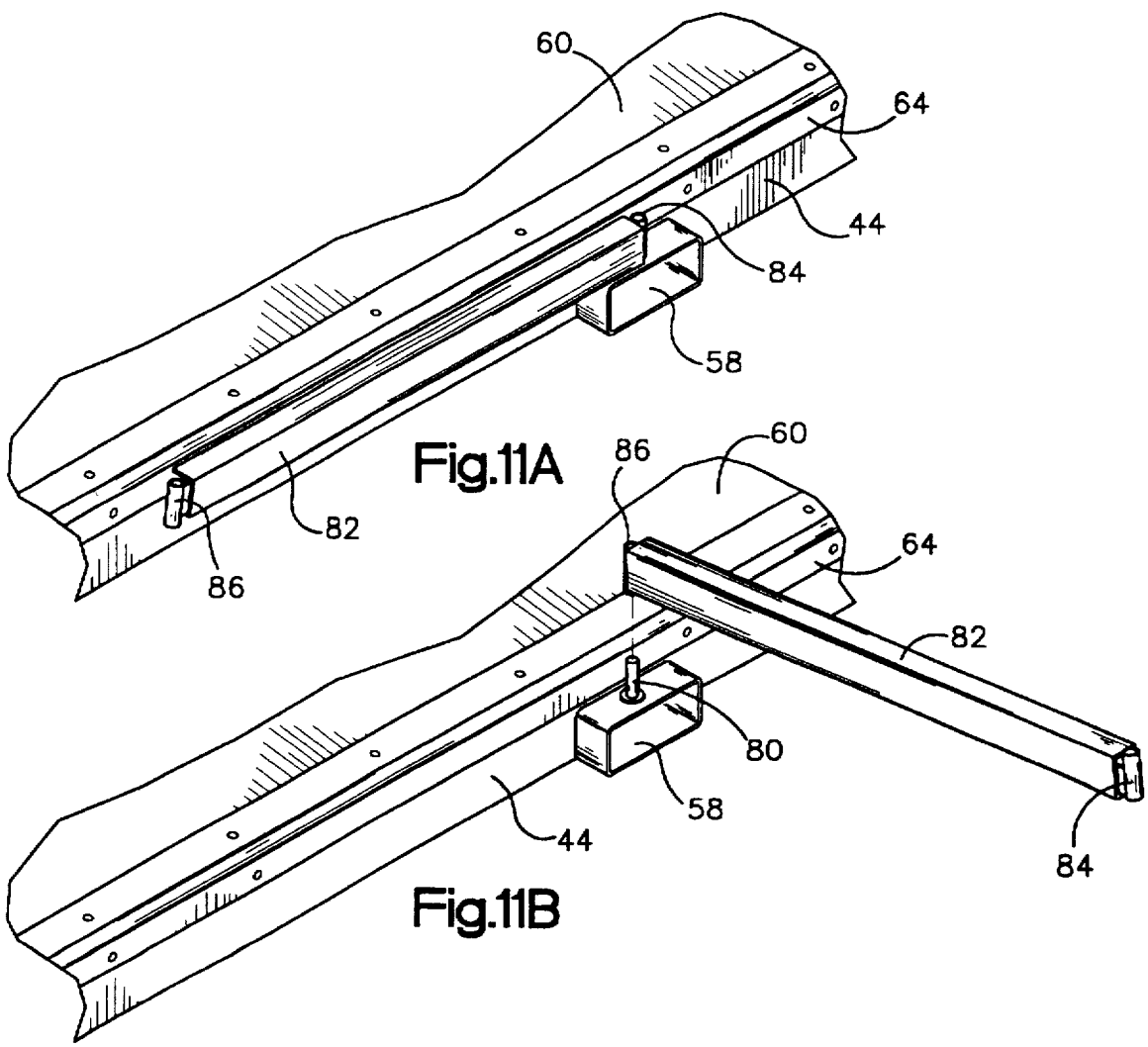

TRANSPORTABLE SPILL CONTAINMENT PAN

BACKGROUND OF THE INVENTION

1. Field of the invention

The invention relates to spill containment techniques for preventing the undesirable discharge of chemical materials onto the ground and, more particularly, to a containment pan that can be positioned conveniently beneath a railroad tank car or other vehicle so as to collect any inadvertent spills.

2. Description of the Prior Art

Traditionally, railroad tank car loading and unloading has been relatively unregulated. In the past, railroad sidings reflected that lack of concern because they had no provision to collect accidental discharges of whatever was being loaded and unloaded. Often the commodity being shipped was inexpensive or perceived to be of little environmental impact, and therefore any spills were either hosed down or just left for the next rain to clear away. With the advent of stiff fines and high soil remediation costs, techniques to prevent spills or eliminate adverse environmental consequences have become important.

Since spills most often occur during a loading or unloading operation, well-designed spill containment pans can be used to collect and possibly economically reuse spilled chemicals. Some spill containment pans actually are only diversion aprons that require the construction of some type of collection sump. These sumps are subject to crack failure or to filling with dirt and water. Since open spill containment pans are exposed to rainwater, snow, and blowing dirt and debris, their effectiveness as spill containment devices may be questionable. Environmental regulations provide that any rainwater collected in these spill containment pans is considered contaminated and must be handled with the same concerns (and at the same cost) as hazardous waste.

Prior efforts to collect leaking, dripping and spilled materials, particularly oily materials, have included providing a flexible plastic drop cloth or sheet which forms a barrier to prevent contact of the chemical material with the ground. The plastic sheet can be either suspended or mounted to the underside of a transport vehicle, as in U.S. Pat. No. 4,396,418, or it can be provided with inflatable or raised edge structures to funnel fluids to a sump or collecting area as described in U.S. Pat. No. 5,099,872. The barrier sheet type containment arrangements generally do not include any means for preventing unwanted ingress of rain, snow, dirt, dust or other environmental contaminants.

Spill pans with convertible lidded structures are known in the art as taught in U.S. Pat. Nos. 5,052,422 and 4,651,887. The latter patent is designed for use between the rails of a railroad siding. The spill pan described in the '887 patent is generally effective for containing spills and drips that fall directly downwardly between the rails. The spill pan in question requires direct overhead placement of the tank car and its discharge opening in order to be in proper position for use. Moreover, the containment apparatus described in the '887 patent does not provide any means for catching and collecting spills occurring outside the rails instead of between them.

Any improved spill containment apparatus is disclosed in U.S. Pat. No. 5,435,458, issued Jul. 25, 1995 to Merrill E. Bishop. In the '458 patent, three separate spill containment pans are disclosed—a center pan disposed between the rails and outboard pans disposed outside each of the rails. The pans have movable covers that prevent dirt or rainwater from entering the pans when the covers are in the closed position. When the covers for the outboard pans are opened, the covers provide additional spill collection surfaces. The cover for the center pan slides longitudinally of the railroad tracks, on special rails, to cover or uncover the center containment pan.

While the apparatus disclosed in the '485 patent has proved to be very effective in practice, it does not address the matter of transportability. That is, the three pans are disposed in a fixed location relative to a railroad siding. The pans are secured to the railroad ties by means of brackets and lag screws. Tank cars to be loaded or unloaded must be positioned properly relative to the pans, or else the pans cannot carry out their intended function of collecting any inadvertent spillage.

Desirably, a spill containment apparatus for use with railroad tank cars would be easily transportable so it could be positioned wherever a tank car was positioned on any railroad spur track. Any such spill containment apparatus hopefully would be relatively compact and lightweight for purposes of transportation, but would be able to be reconfigured on site to provide an adequate spill-collection area beneath a tank car. Also, it would be desirable for a number of such devices to be capable of being stored compactly and conveniently.

SUMMARY OF THE INVENTION

In response to the forgoing and other concerns, the present invention provides a new and improved portable spill containment pan especially adapted for use with railroad tank cars. The spill containment pan according to the present invention has a reservoir portion adapted to be disposed centrally between the rails. Laterally extending portions of the pan are adapted to be rested atop the rails beneath a stationary tank car.

The invention includes a pair of flaps that are hingedly connected to the pan along the upper, side edges of the pan. The flaps can be folded toward each other when the pan is not in use. In the folded or closed position, the flaps form a closed roof that prevents the ingress of water, dirt, or other environmental contaminants. In the unfolded or open position, the flaps extend over the railroad rails and provide spill-collection surfaces. Any spills that impact the open flaps will be directed into the reservoir.

A pair of tubes extend transversely across the reservoir and through the opposed sidewalls defining the reservoir. The tubes are of a size and shape to receive the forks of a conventional forklift truck. The tubes are spaced apart approximately 30 inches on center, the distance by which conventional forklift forks are spaced. Accordingly, when one or both of the flaps are in their closed position, a forklift truck can be used to pick up the spill containment pan and move it wherever desired.

The flaps are configured at their ends to provide horizontal ledges when the flaps are in the closed position. The ledges can be used to support the bottom wall of another spill containment pan that is stacked thereon. Accordingly, a number of pans can be stacked atop each other in a compact manner.

The spill containment pan according to the invention provides many of the advantages of prior spill containment pans while having the additional advantage of being transportable. The stacking feature enables the user to store a number of pans in an unobtrusive manner.

The foregoing and further features and advantages of the invention will be apparent from the description and claims that follow, taken in conjunction with the accompanying drawings.

BRIEF DESCRIPTION OF THE DRAWINGS

FIG. 3 is a view similar to FIG. 2 with the flaps in a closed position;

FIG. 4 is a view similar to FIG. 2 showing how the pan can be carried by a forklift truck;

FIG. 6 is a cross-sectional view similar to FIG. 5 with the flaps in a closed position;

FIG. 7 is a view similar to FIG. 6 showing the flaps in an open position;

FIG. 8 is an enlarged, perspective view of one end of the spill containment pan according to the invention showing a technique for stacking the pans;

FIG. 9 is a cross-sectional view taken along a plane indicated by line 9—9 in FIG. 8;

FIGS. 10A and 10B are enlarged, cross-sectional views of a hinge used to pivotally support the flaps for movement between open and closed positions; and FIGS. 11A and 11B are perspective views of support arms used to support the flaps in an open position.

DESCRIPTION OF THE PREFERRED EMBODIMENT

Figure 1:
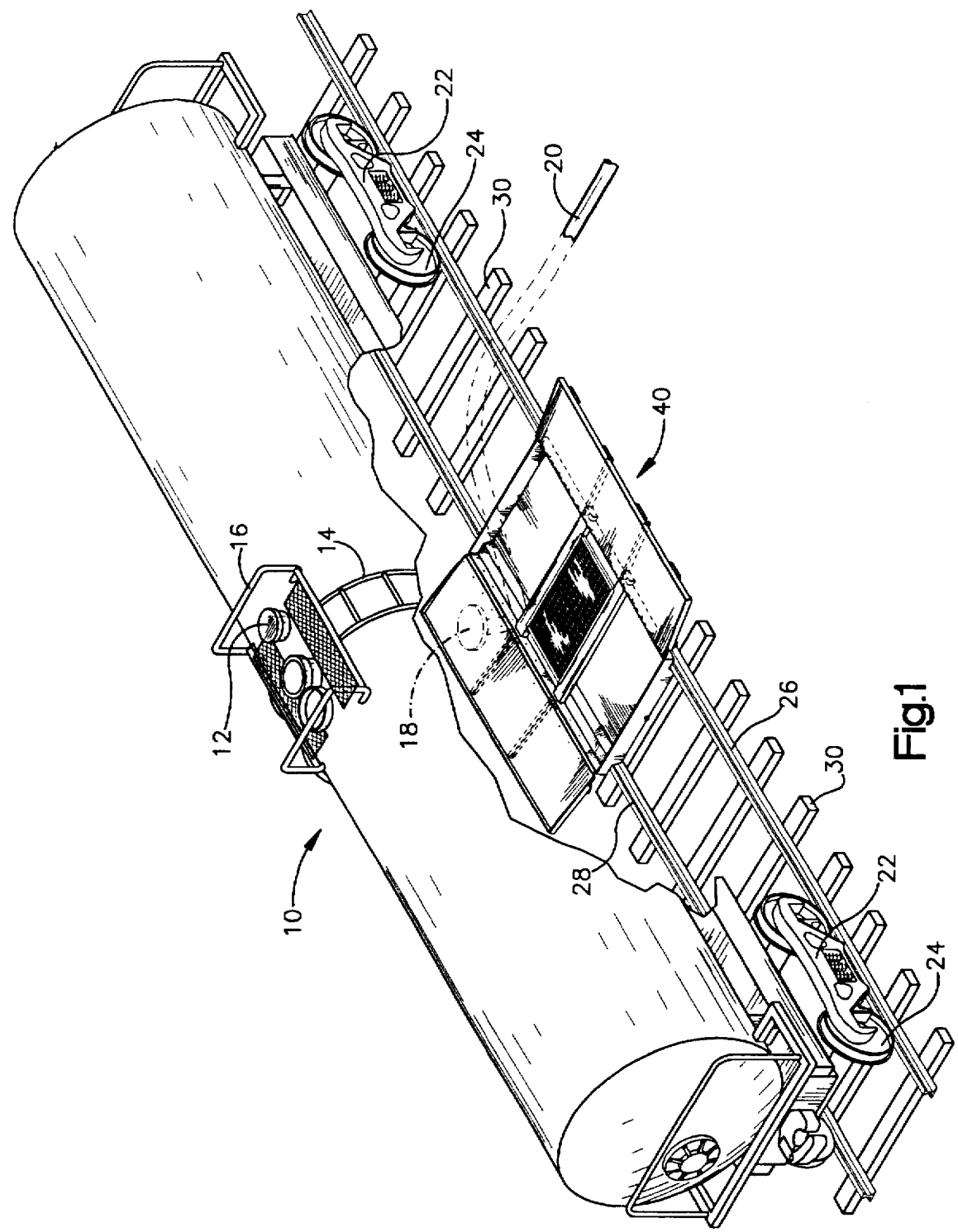
FIG. 1 is a perspective view of a railroad tank car positioned above a spill containment pan according to the present invention.

Referring to FIG. 1, a railroad tank car is indicated by the reference numeral 10. As used herein, the term "railroad tank car" is intended to encompass any railed vehicle that can be loaded or unloaded, whether at a railroad siding or elsewhere. As will be appreciated from the description that follows, the present invention is intended for use at any location where a railroad tank car can be stopped. The tank car 10 includes a top opening 12 through which chemicals can be loaded into the tank car 10. The top opening 12 is accessible by way of permanently mounted ladders 14 that are connected to a superstructure 16. The tank car 10 includes a bottom opening 18 through which chemicals can be unloaded from the tank car 10 through a hose 20. As is conventional, the tank car 10 includes trucks 22 having wheels 24. The wheels 24 ride upon parallel rails 26, 28 which are secured to ties 30.

Referring now to FIGS. 1–7, a spill containment pan according to the invention is indicated generally by the reference numeral 40. The pan 40 has a bottom wall 42, opposed sidewalls 44, and opposed endwalls 46. Together, the bottom wall 42, the sidewalls 44, and the endwalls 46 define a reservoir 48 within which inadvertently spilled chemicals can be collected. The upper periphery of the sidewalls 44 and the endwalls 46 defines a top opening 49 through which chemicals can enter the reservoir 48. When view from above, the pan 40 is rectangular such that it will fit between the spaced, parallel rails 26, 28.

Referring particularly to FIG. 6, the bottom wall 42 includes a central portion 50 that is disposed below the level of the rails 26, 28. Laterally extending portions 52 of the bottom wall 42 rest upon the rails 26, 28. Transition portions 54 connect the central portion 50 and the laterally extending portions 52. This construction provides a deep reservoir 48 that will accommodate a large quantity of chemicals. Also, the transition portions 54 serve as guides that enable the central portion 50 to be nested conveniently between the rails 26, 28. A coupling 55 extends through each endwall 46 near the intersection with the bottom wall 42 to enable the reservoir 48 to be drained or pumped dry through suitable piping (not shown).

A pair of rectangular tubes 56, 58 extend laterally across the reservoir 48 and through openings formed in the opposing sidewalls 44. The tubes 56, 58 are approximately three inches high by six inches wide. The centerlines of the tubes 56, 58 are spaced approximately 30 inches apart. The dimensions of the tubes 56, 58 and their lateral spacing enables them to accommodate the forks of a conventional forklift truck.

The pan 40 includes a pair of flaps 60, 62 that are connected to the upper edges of the sidewalls 44 by means of piano hinges 64. The flaps 60, 62 include depending flanges 66 at that edge of the flaps 60, 62 opposite the piano hinges 64. At their ends, the flaps 60, 62 include vertically extending endwalls 68 having ledges 69. When the flaps 60, 62 are closed, the bottom edges of the endwalls 68 rest on the upper edges of the endwalls 46.

The ledges 69 form a continuous horizontal surface at each end of the pan 40. The ledges 69 are provided with vertically extending tabs 70 and cleats 72. Small, longitudinally extending plates 74 are secured to the flaps 60, 62 at the corners adjacent the ends of the hinges 64. Pivotally mounted handles 75 (FIGS. 3 and 6) are secured to the outer surface of the flaps 60, 62.

Referring particularly to FIGS. 10A and 10B, the hinges 64 are secured to the sidewalls 44 and the flaps 60, 62 by means of fasteners 76. The fasteners 76 may take the form of rivets, bolts or any other convenient technique for securing the hinges 64 to the flaps 60, 62. A sheet 78 of polyethylene film is disposed between the outer surfaces of the flaps 60, 62 and the sidewalls 44 and the inner surfaces of the hinges 64. As can be seen in FIGS. 10A and 10B, the sheet 78 forms a fluid-impervious barrier at the intersection between the flaps 60, 62 and the sidewalls 44.

Referring now to FIGS. 10A, 10B, 11A and 11B, a vertical support post 80 is secured to the upper side of each of the tubes 56, 58 at that point where the tubes 56, 58 extend beyond the sidewalls 44. A support arm 82 in the form of a channel section is connected to each of the posts 80. The arm 82 includes small pipe sections 84, 86 at each end. The pipe section 84 has a longitudinal axis that is disposed at right angles to the longitudinal axis of the arm 82. The pipe section 86 has a longitudinal axis that is disposed at an angle of approximately 83 degrees from the longitudinal axis of the arm 82. The posts 80 and the pipe sections 84, 86 include small openings through which hitch pins (not shown) may be inserted to lock the pipe sections 84, 86 and, hence, the arms 82, in a desired position relative to the posts 80. As shown in the various Figures, particularly FIGS. 3 and 11A, when the pipe sections 84 are mounted on the posts 80, the arms 82 can be stored against the sidewalls 44. When the pipe sections 86 are mounted on the posts 80 as best shown in FIGS. 7 and 11B, the arms 82 can be extended away from the sidewalls 44 at an angle to the horizontal of about seven degrees. The arms 82 in this position constitute means for supporting the flaps 60, 62 at an angle to the horizontal.

A removable platform 90 is provided for the convenience of workers when they must kneel beneath the tank car 10 to couple or uncouple the hose 20. The platform 90 comprises a sheet 92 made of expanded metal that is supported by a rectangular frame 94 having sides 96 made of angle iron. As shown in FIGS. 3 and 4, the frame 94 is wide enough so that the laterally extending portions of the sides 96 rest atop the tubes 56, 58. The platform 90 can be stored inside the pan 40 when the flaps 60, 62 are closed, or it can be removed and stored elsewhere, if desired.

Operation

When the pan 40 is not being used, the flaps 60, 62 are pivoted to their closed position shown in FIGS. 3 and 6. In this position, the flaps 60, 62 completely cover the reservoir 18 and prevent the ingress of water, snow, dirt, or any other environmental contaminents. The sealing action is enhanced due to the compression of the flanges 66 against each other. The flaps 60, 62 are higher at the center of the reservoir 18 than at the sides. Accordingly, any foreign substance such as rain will tend to flow from the top of the pan 40 toward the sides. The endwalls 68 and the plates 74 prevent water or other contaminants from entering the reservoir 48 at the ends of the flaps 60, 62. Similarly, the sheet 78 prevents water from entering the reservoir 48 through the hinges 64. The foregoing components also inhibit chemicals contained within the reservoir 48 from being spilled outside the pan 40 when the pan 40 is being moved from place to place.

When the flaps 60, 62 are in their closed position, the ledges 69 at each end of the pan 40 form a continuous horizontal surface. Accordingly, additional pans 40 can be stacked atop each other with the ends of the bottom wall 42 resting atop the ledges 69. Such a feature provides a convenient way for a number of pans 40 to be stored compactly. The tabs 70 and cleats 72 assist in positioning the pans 40 properly with respect to each other.

Figure 2:
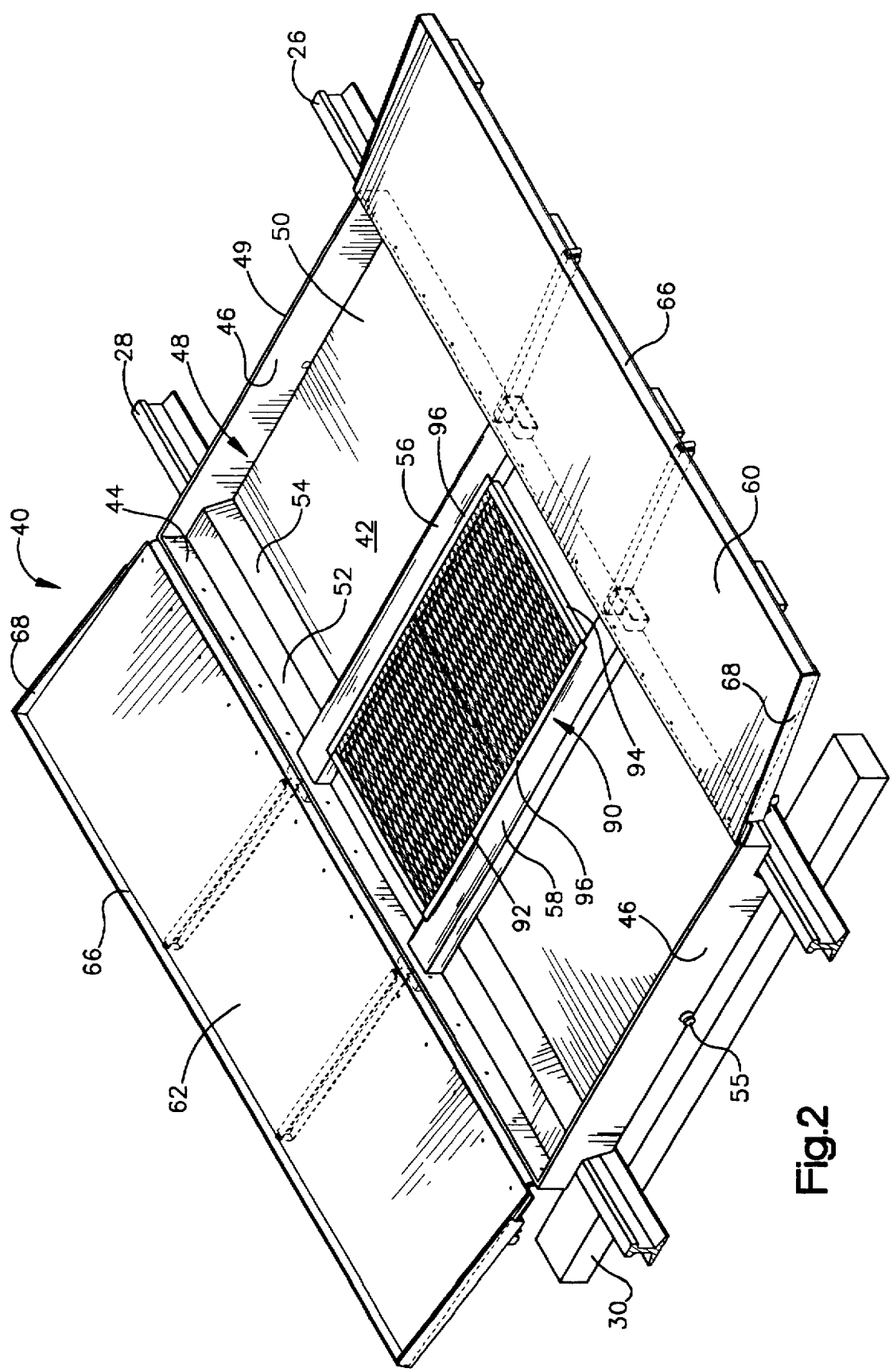
FIG. 2 is a view similar to FIG. 1 with the railroad tank car removed and spill-collecting flaps in an open position.
Figure 5:
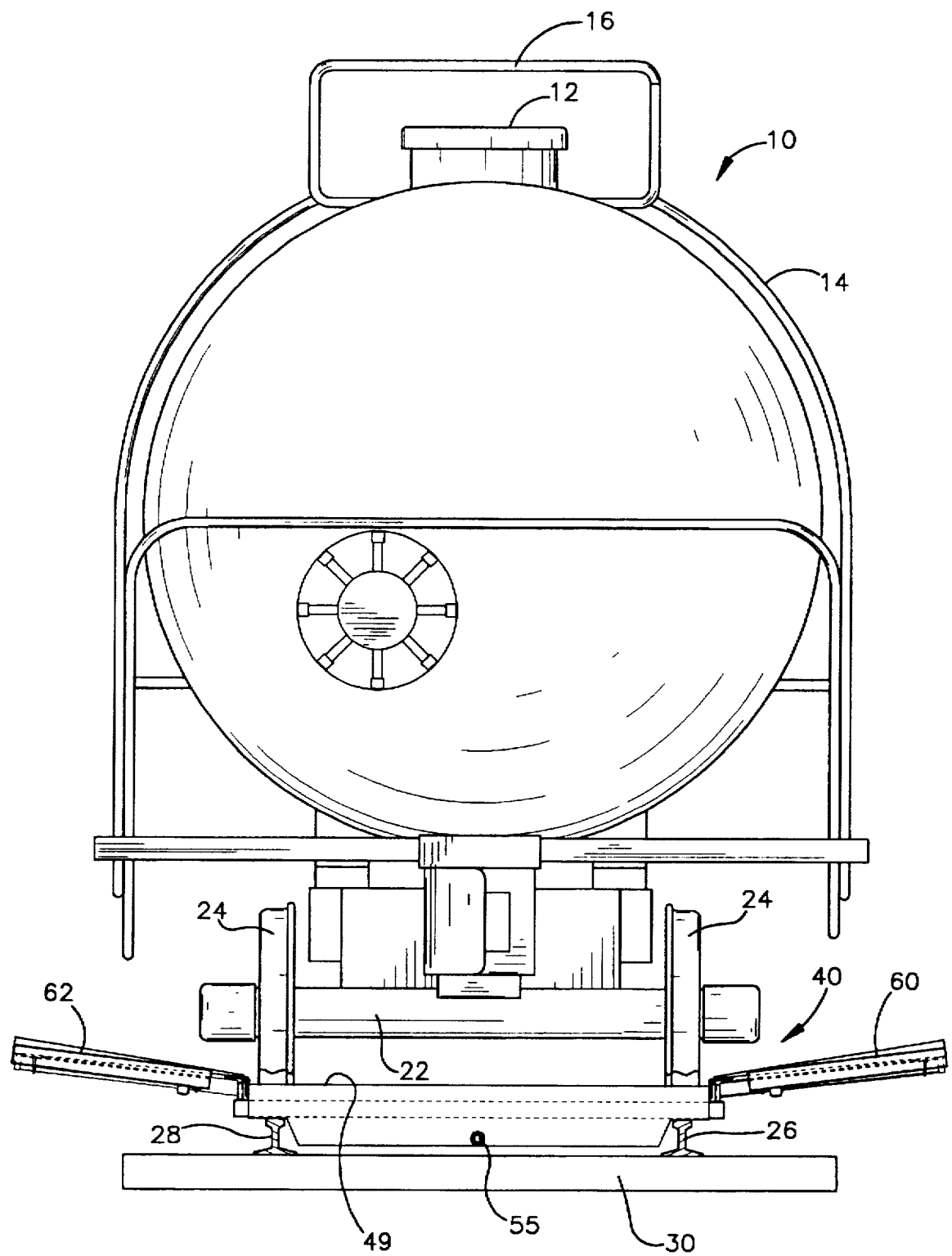
FIG. 5 is a cross-sectional view of the spill containment pan of FIG. 1 with the flaps in an open position.

When it is desired to use the pan 40 to collect inadvertent spills from a tank car 10, the forks of a forklift truck are inserted into the tubes 56, 58. The flap 62 is raised so that it rests against the vertical component of the forks (FIG. 4). The arms 82 on the other side of the pan 40 are positioned as shown in FIGS. 2, 4, and 11B, and the flap 60 is opened so that it rests on the outwardly extending arms 82. Thereafter, the pan 40 can be moved to a position beneath the stationary tank car 10, as shown in FIG. 1. Upon backing the forklift truck away from the tank car 10, the flap 62 will be lowered to that position shown in FIGS. 1 and 2. When it is desired to move the pan 40 from beneath the tank car 10, the foregoing process is reversed, that is, flap 62 is raised, the forklifts are inserted into the tubes 56, 58, the pan 40 is lifted slightly and moved from beneath the tank car 10, and the flaps 60, 62 and the arms 82 are closed in preparation for stacking.

As will be apparent from the foregoing description, the present invention provides an effective technique for catching inadvertent spills from railroad tank cars. Importantly, the invention is readily transportable by the use of commonly available forklift trucks. The invention is compact, lightweight, and capable of being stacked conveniently and safely.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A transportable spill containment pan adapted to be disposed beneath a railroad tank car between railroad rails on which the tank car is resting and to be moved by a forklift truck having forks, comprising:

a bottom wall from which upstanding peripheral sidewalls and endwalls extend, the bottom wall, the sidewalls, and the endwalls defining a reservoir having a top opening;

first and second flaps connected to the sidewalls, the first and second flaps being movable from a first, inwardly folded position where they overlie the reservoir and provide a cover for the top opening, and a second, outwardly extended position where they overlie the rails to catch inadvertent spills and direct the spills into the reservoir;

support arms extending outwardly of the pan to support the flaps in the outwardly extended position, the support arms being connected to the tubes at that location where the tubes extend through the sidewalls; and parallel, spaced tubes extending across the reservoir and opening through the opposed sidewalls, the tubes being of a size and shape to receive the forks of the forklift truck.

2. The pan of claim 1, wherein the sidewalls include upper edges and the first and second flaps are pivotally connected to the sidewalls at the upper edges thereof.

3. The pan of claim 1, wherein the flaps in the second position are angled upwardly from the sidewalls at an angle of approximately seven degrees to the horizontal.

4. The pan of claim 1, wherein the flaps in the inwardly folded position define a non-horizontal surface.

5. The pan of claim 4, wherein the reservoir has a center and the flaps are peaked at the center of the reservoir and slope downwardly toward the sidewalls.

6. The pan of claim 1, wherein the flaps have ends, and further comprising second endwalls connected to the ends of the flaps, the second endwalls contacting the upper edges of the endwalls defining the reservoir when the flaps are in the outwardly extended position.

7. The pan of claim 6, wherein the second endwalls form a horizontal surface when the flaps are in the inwardly folded position, the horizontal surface lying in a plane above the flaps, the horizontal surface adapted to receive and support a bottom wall of another pan disposed thereon.

8. The pan of claim 6, wherein the second endwalls are in the form of angle irons, and further including clips extending from the second endwalls for engaging another pan disposed atop the second endwalls.

9. The pan of claim 1, further comprising a fluid-impervious barrier at the intersection of the flaps and the sidewalls.

10. The pan of claim 9, wherein the sidewalls include upper edges and the first and second flaps are pivotally connected to the sidewalls at the upper edges thereof, and the fluid-impervious barrier covers the pivotal connection between the flaps and the upper edges of the sidewalls.

11. The pan of claim 9, wherein the fluid-impervious barrier is a sheet of polyethylene film.

12. A transportable spill containment pan adapted to be disposed beneath a railroad tank car between railroad rails on which the tank car is resting and to be moved by a forklift truck having forks, comprising:

a bottom wall from which upstanding peripheral sidewalls and endwalls extend, the bottom wall, the sidewalls, and the endwalls defining a reservoir having a top opening and a center, the sidewalls and the endwalls having upper edges;

first and second flaps pivotally connected to the sidewalls at the upper edges thereof, the first and second flaps movable from a first, inwardly folded position where they overlie the reservoir and provide a cover therefor, and a second, outwardly extended position where they can catch inadvertent spills and direct the spills into the reservoir, the flaps in the inwardly folded position defining a non-horizontal surface that is peaked at the center of the reservoir and which slopes downwardly to the sidewalls, the flaps having ends;

parallel, spaced tubes extending across the reservoir and opening through the opposed sidewalls, the tubes being of a size and shape to receive the forks of the forklift truck;

support arms to support the flaps in the outwardly extended position, the support arms being connected to the tubes at that location where the tubes extend through the sidewalls;

second endwalls in the form of angle irons connected to the ends of the flaps, the second endwalls contacting the upper edges of the endwalls when the flaps are in the inwardly folded position, the second endwalls defining a horizontal surface when the flaps are in the inwardly folded position, the horizontal surface lying in a plane above the flaps, the horizontal surface adapted to receive and support a bottom wall of another pan disposed thereon; and the bottom wall includes a central portion that in use is disposed between the railroad rails, laterally extending portions that lie atop the railroad rails in use, and transition portions that extend between and connect the central portion and the laterally extending portions.

13. A method of collecting inadvertent spills from a stationary railroad tank car, comprising the steps of:

providing a transportable spill containment pan having a bottom wall from which upstanding peripheral sidewalls and endwalls extend, the bottom wall, the sidewalls, and the endwalls defining a reservoir having a top opening;

providing first and second flaps connected to the sidewalls, the first and second flaps being movable from a first, inwardly folded position where they overlie the reservoir and provide a cover for the top opening, and a second, outwardly extended position where they catch inadvertent spills and direct the spills into the reservoir;

providing parallel, spaced tubes extending across the reservoir and opening through the opposed sidewalls, the tubes being of a size and shape to receive the forks of a conventional forklift truck;

inserting the forks of a forklift truck into the tubes;

opening the flaps so that the one closest to the forklift truck rests in a near-vertical position and the other flap is in its extended position;

lifting the pan and positioning the pan beneath a stationary railroad tank car between the railroad rails on which the tank car is resting; and withdrawing the forks and permitting the near-vertical flap to be lowered to its extended position.

14. A transportable spill containment pan adapted to be disposed beneath a railroad tank car between railroad rails on which the tank car is resting and to be moved by a forklift truck having forks, comprising:

a bottom wall from which upstanding peripheral sidewalls and endwalls extend, the bottom wall, the sidewalls, and the endwalls defining a reservoir having a top opening;

the bottom wall including a central portion that in use is disposed between the railroad rails, laterally extending portions that lie atop the railroad rails in use, and transition portions that extend between and connect the central portion and the laterally extending portions;

first and second flaps connected to the sidewalls, the first and second flaps being movable from a first, inwardly folded position where they overlie the reservoir and provide a cover for the top opening, and a second, outwardly extended position where they overlie the rails to catch inadvertent spills and direct the spills into the reservoir; and parallel, spaced tubes extending across the reservoir and opening through the opposed sidewalls, the tubes being of a size and shape to receive the forks of the forklift truck.

15. The transportable spill containment pan of claim 14, further comprising a fluid-impervious barrier at the intersection of the flaps and the sidewalls.

16. The pan of claim 15, wherein the sidewalls include upper edges and the first and second flaps are pivotally connected to the sidewalls at the upper edges thereof, and the fluid-impervious barrier covers the pivotal connection between the flaps and the upper edges of the sidewalls.

17. The pan of claim 15, wherein the fluid-impervious barrier is a sheet of polyethylene film.

* * * * *